(12) United States Patent
Butterfield

(10) Patent No.: US 9,653,713 B2
(45) Date of Patent: May 16, 2017

(54) FOLDING CELL HOLDER

(71) Applicant: Eetrex, Inc., Boulder, CO (US)

(72) Inventor: Kyle William Butterfield, Boulder, CO (US)

(73) Assignee: EETREX, INC., Boulder, CO (US)

( * ) Notice: Subject to any disclaimer, the term of this patent is extended or adjusted under 35 U.S.C. 154(b) by 781 days.

(21) Appl. No.: 13/919,669

(22) Filed: Jun. 17, 2013

(65) Prior Publication Data

US 2013/0337307 A1 Dec. 19, 2013

Related U.S. Application Data

(60) Provisional application No. 61/660,551, filed on Jun. 15, 2012.

(51) Int. Cl.
*H01M 2/10* (2006.01)
*H01M 2/20* (2006.01)

(52) U.S. Cl.
CPC ........... *H01M 2/10* (2013.01); *H01M 2/1077* (2013.01); *H01M 2/206* (2013.01)

(58) Field of Classification Search
None
See application file for complete search history.

(56) References Cited

U.S. PATENT DOCUMENTS

| 5,853,915 | A | 12/1998 | Suto | |
| 2001/0002298 | A1* | 5/2001 | Leung | H01M 2/1061 429/9 |
| 2007/0020516 | A1 | 1/2007 | Yoon | |
| 2007/0184339 | A1* | 8/2007 | Scheucher | H01M 2/1077 429/99 |
| 2009/0311891 | A1 | 12/2009 | Lawrence et al. | |

OTHER PUBLICATIONS

International Search Report and Written Opinion regarding PCT/US2013/046161, dated Dec. 2, 2013.

* cited by examiner

*Primary Examiner* — Barbara Gilliam
*Assistant Examiner* — Adam A Arciero
(74) *Attorney, Agent, or Firm* — Polsinelli PC

(57) ABSTRACT

A battery cell holder that may be used to form interconnection of cells in series and/or parallel arrangements. The cell holder includes slots for receiving battery cells, conductive apertures within the slots for attaching a conductor to the cells, and a hinge. The cell holder is foldable about the hinge and includes a keying system that allows multiple cell holders to be interconnected to form battery packs of multiple sizes and arrangements.

13 Claims, 15 Drawing Sheets

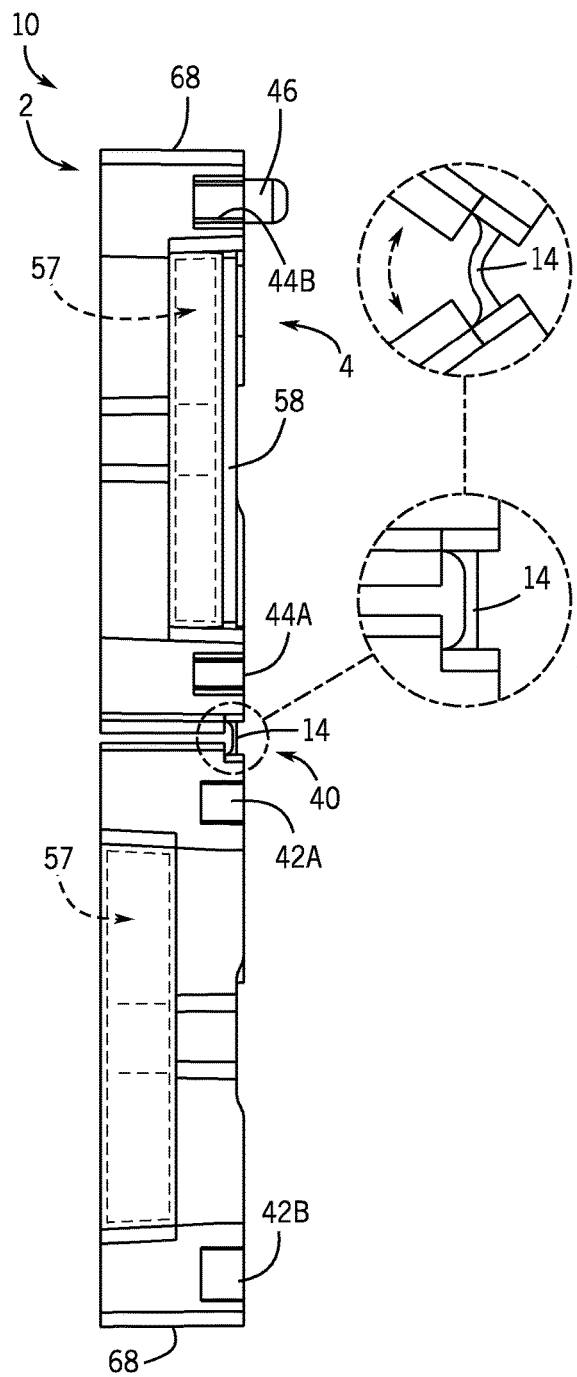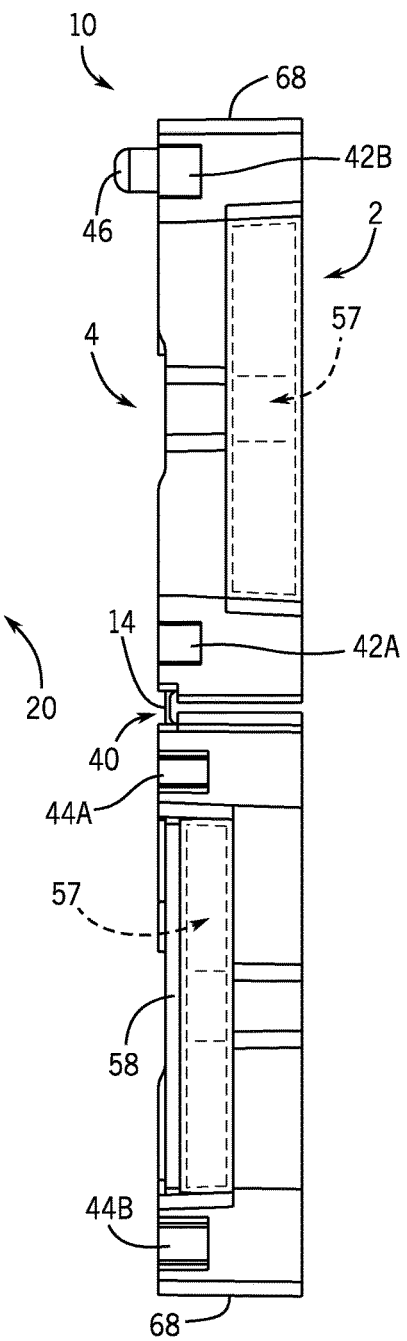
FIG. 4
FIG. 5

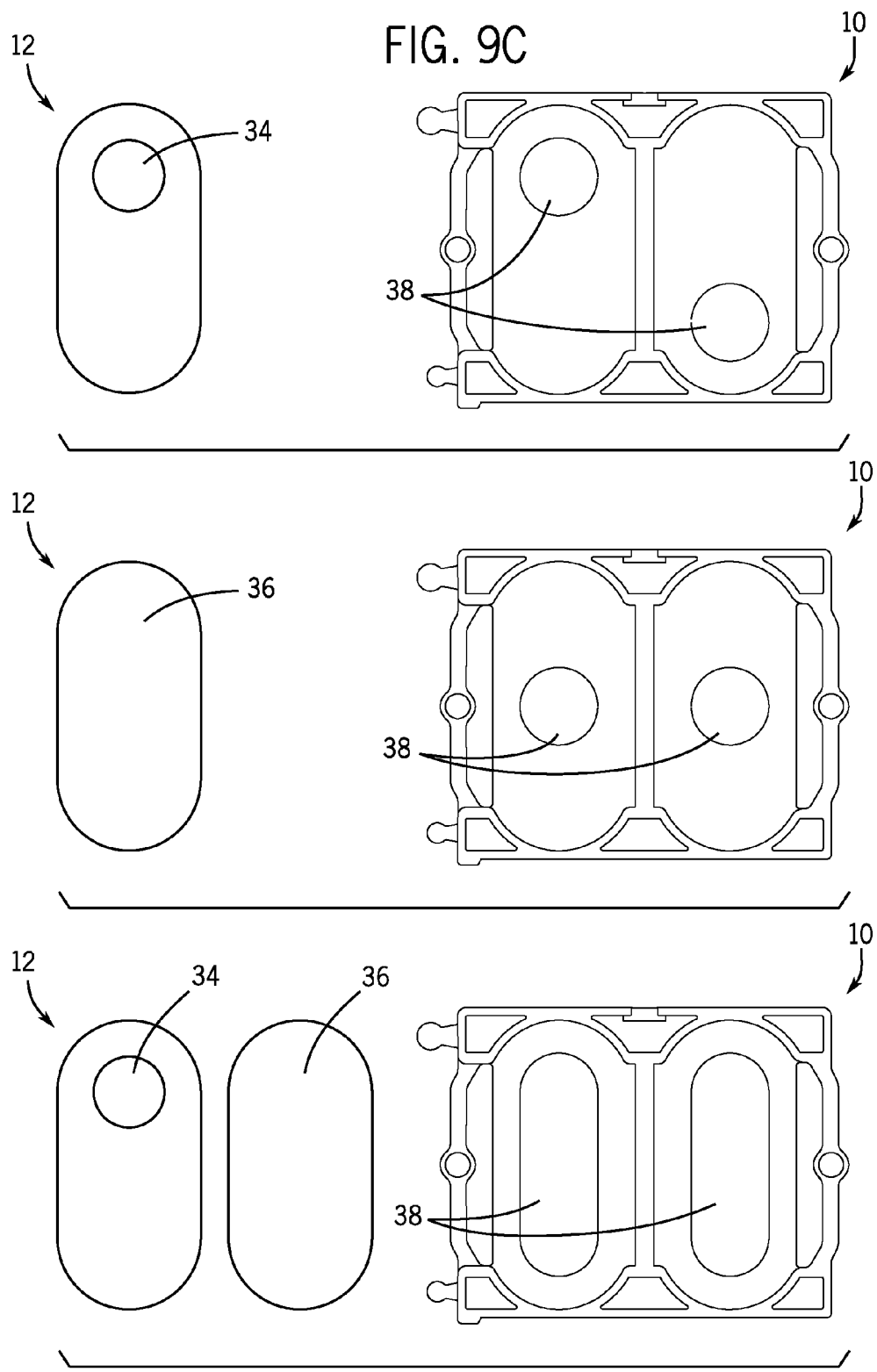

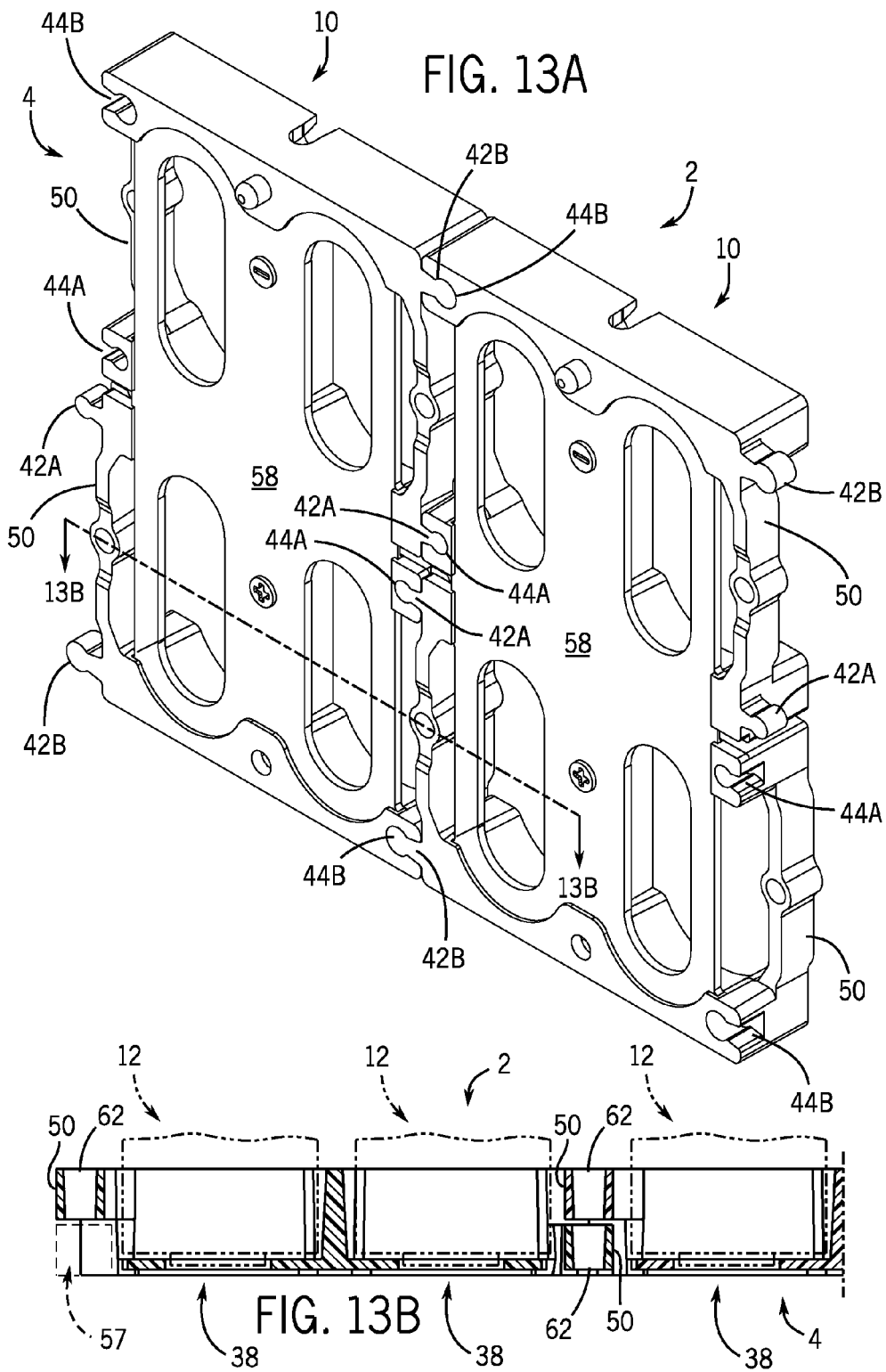

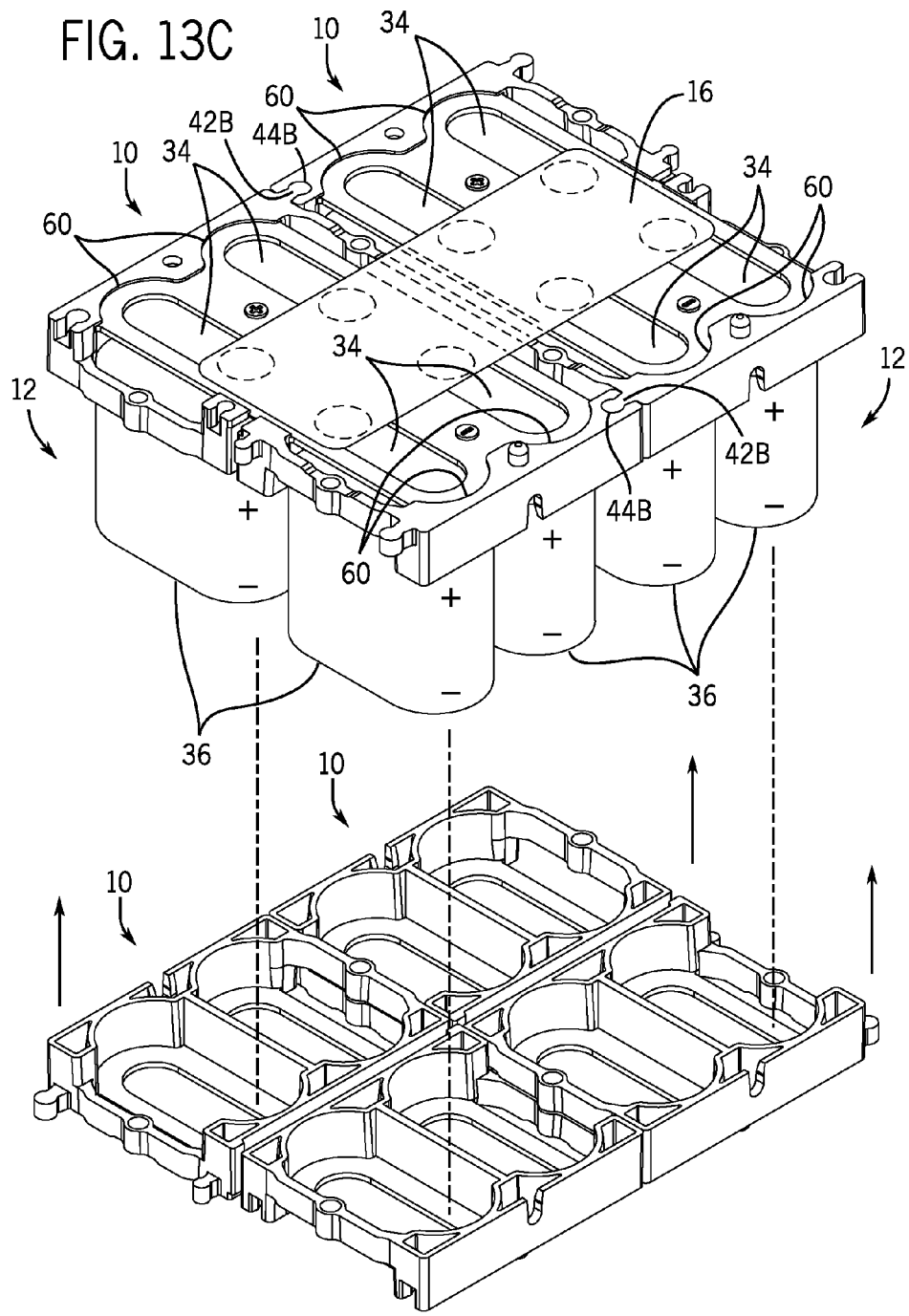

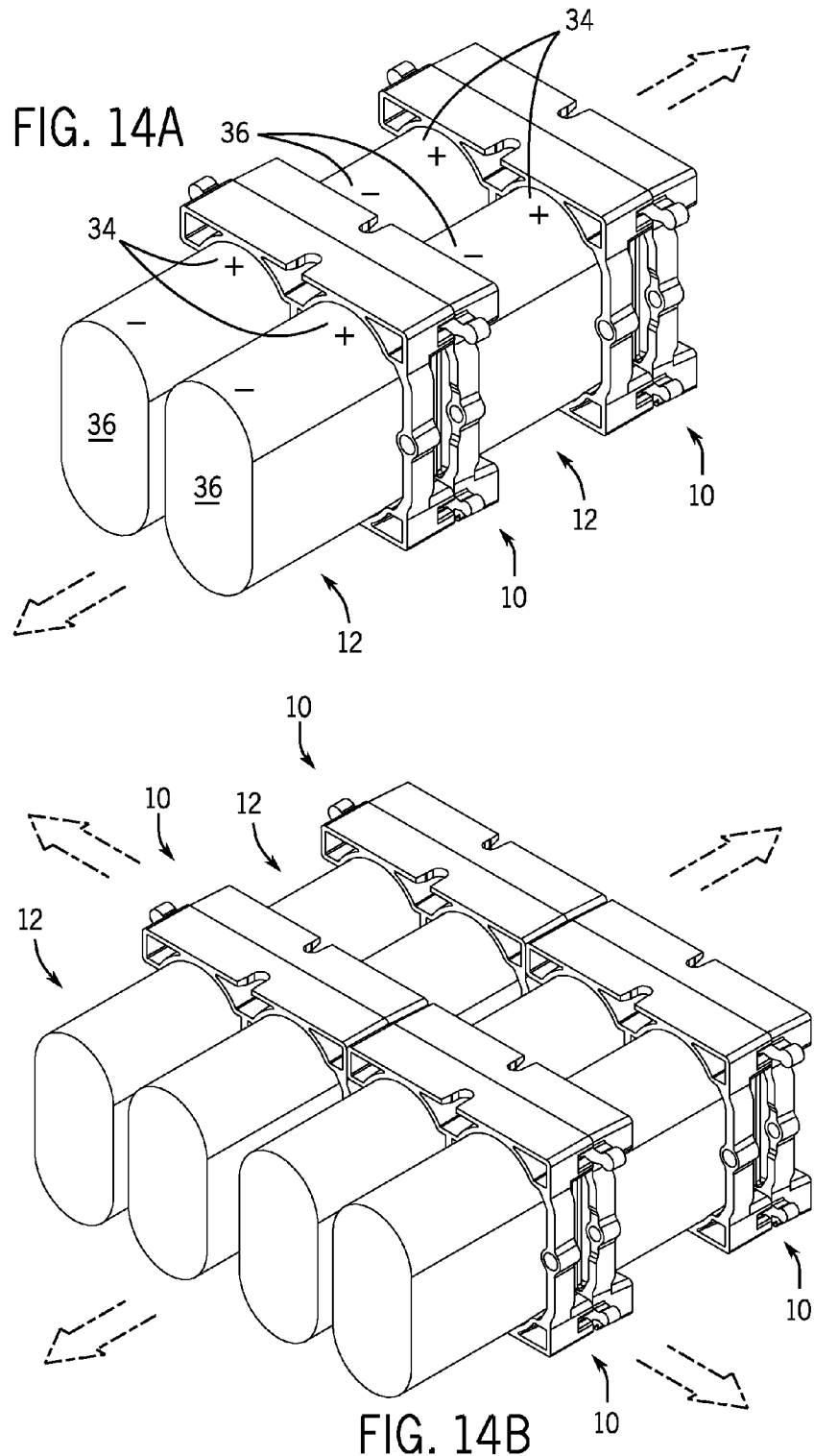

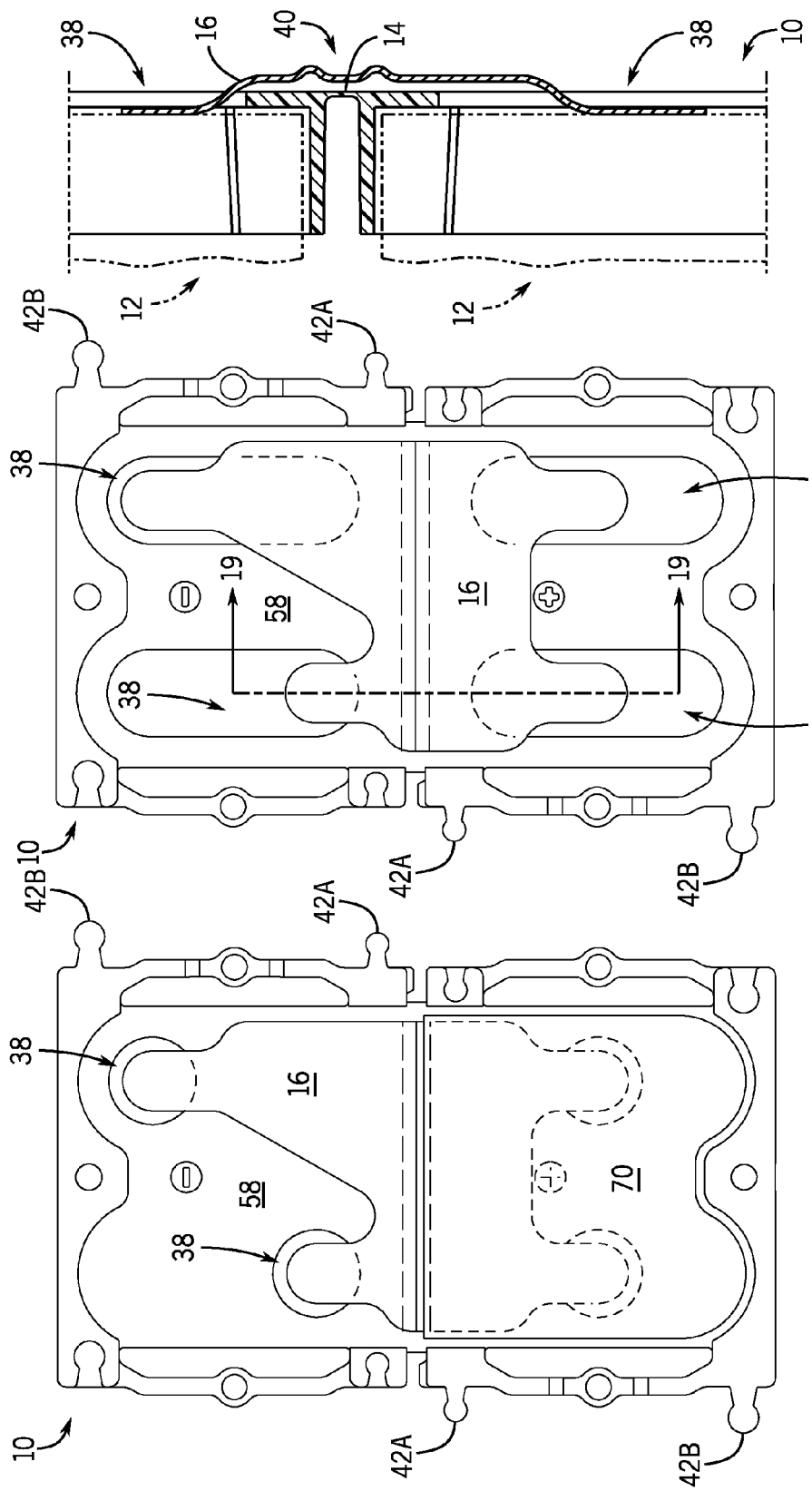

FOLDING CELL HOLDER

CROSS REFERENCE TO RELATED APPLICATION

The present application claims priority under 35 U.S.C. §119 to U.S. provisional patent application 61/660,551, which was filed Jun. 15, 2012, entitled "FOLDING CELL HOLDER," and is hereby incorporated by reference in its entirety into the present application.

TECHNICAL FIELD

Aspects of the present disclosure involve a battery cell holder and more particularly involve a folding battery cell holder that may be used to form an interconnection of cells in series and/or parallel and thereby form a battery pack comprising a plurality of such interconnected cells.

BACKGROUND

One of the challenges in energy storage, whether for mobile applications such as vehicles or for stationary applications such as uninterruptible power supplies, is fixturing or otherwise holding discrete battery cells in a large pack configuration that may include several to hundreds of individual cells. It is nearly always the case that cells are positioned in some form of parallel and/or series arrangement to provide sufficient voltage and current capacity for any given application. Thus, for example, to form a 48 volt DC battery pack from 2 volt cells, 24 cells are connected in series. Depending on the current that the pack supplies, the series string of 24 cells may be connected in parallel with one or more additional 24 cell strings. Conventionally, the frame work that supports the cells and provides the series and parallel electrical connections, are custom designed and deployed in accordance with the requirements of any given pack.

What is needed, among other things, is a battery cell holder that may be used to connect cells in series and/or parallel, and may be used for various possible pack requirements. It is with these and other issues in mind that various aspects of the present disclosure were developed.

BRIEF SUMMARY

Aspects of the present disclosure involve a battery cell holder that facilitates connecting cells in the holder in a series and/or parallel arrangement. The battery cell holder is scalable such that multiple holders may be physically and electrically coupled to form battery packs in series and/or in parallel arrangement to meet requirements of various battery architectures. The holders, and thus the packs, are a convenient height of about 1 U (i.e., 1.75 inches) so as to accommodate placement in standard-size server racks (e.g., 19 inch rack).

The front face of the holder includes cell slots and cell apertures within each cell slot. In a certain embodiment, the holder is generally a square-shape with a hinge dividing the holder's front face into two sets of two cell slots. The holder is foldable about the hinge and configured such that either the positive or negative conductive ends of a cell may be placed in a cell slot so that the conductive end is exposed in the cell aperture. The rear face of the holder accommodates the placement of a conductor and includes a conductive recess and engaging features. The conductor is placed on the rear face of the holder when the holder is in the unfolded orientation. The cell holder is folded, along the hinge, and the conductor is secured in place by the interaction between opposing engagement features on an upper and lower portion of the rear face. The conductor is held in place in such a way that it can contact respective positive or negative conductive ends of a cell that is placed in the slots. Additionally, the holder is secured in the folded position by a pin on an outer end of the rear face that is matingly received by a pin socket on a corresponding outer end of the rear face. As far as maintaining an electrical connection in the folded position, the conductive recess allows the conductor to bend or fold accordingly when the holder is in the folded position. When the holder is folded, the conductor is insulated by surrounding walls of the holder.

In order to facilitate in series or end-to-end connection, the cells in the holder are arranged such that cells on each side of the hinge are inserted into the slots with the same polarity being exposed in the cell apertures and cells on opposing sides of the hinge are inserted with opposing polarities being exposed in the cell apertures. A conductor is placed on the rear face of the holder and placed in contact with the conductive ends of each cell. The holder is folded closed.

In order to facilitate an in series or end-to-end battery pack with multiple cell holders, a holder is arranged as described previously. The ends of the cells that are not inserted into the holder can be inserted into respective slots of additional holders. Additional cells can be added to the empty slots accordingly so as to increase the capacity of the battery pack.

In order to facilitate in parallel or side-to-side connection, the cells in the holder are arranged such that all cells in a particular holder are inserted with the same polarity being exposed in the cell apertures. A conductor is placed on the rear face of the holder and placed in contact with the conductive ends of each cell. The holder is folded closed.

In order to facilitate an in parallel or side-to-side battery pack with multiple cell holders, each holder additionally includes a keying system that includes keys and key receptacles on sides of the holder whereby multiple holders can be interconnected on either side of the holder. To link holders in a parallel connection, multiple holders are arranged as described previously and keys on a particular holder can be interconnected with key receptacles on adjacent holders.

Other implementations are also described and recited herein. Further, while multiple implementations are disclosed, still other implementations of the presently disclosed technology will become apparent to those skilled in the art from the following detailed description, which shows and describes illustrative implementations of the presently disclosed technology. As will be realized, the presently disclosed technology is capable of modification in various aspects, all without departing from the spirit and scope of the presently disclosed technology. Accordingly, the drawings and detailed description are to be regarded as illustrative in nature and not limiting.

BRIEF DESCRIPTION OF THE DRAWINGS

Example embodiments are illustrated in referenced figures of the drawings. It is intended that the embodiments and figures disclosed herein are to be considered illustrative rather than limiting. Also, in the drawings the like reference characters refer to the same parts throughout the different views.

FIG. 4 is a right side view of the folding battery cell holder of FIG. 1 including a close-up view of a living hinge feature and a view of a folded folding battery cell holder;

FIG. 5 is a left side view of the folding battery cell holder of FIG. 1;

FIG. 9C is a drawing illustrating various conductive ends of a battery cell and corresponding battery cell aperture embodiments;

FIG. 13A is an isometric view of multiple interconnected folding battery cell holders of FIG. 1;

FIG. 13B is a cutaway view of the multiple interconnected folding battery cell holders of FIG. 13A;

FIG. 13C is an isometric view of multiple interconnected folding battery cell holders of FIG. 13A in a parallel connection;

FIG. 14A is an isometric view of multiple folding battery cell holders of FIG. 1 in an in series connection;

FIG. 14B is an isometric view of a series string of folding battery cell holders of FIG. 1 connected in parallel with additional battery cell holders.

FIG. 17 is a view of a conductor on the rear face of the folding battery cell holder with cell apertures according to FIG. 15;

FIG. 18 is a view of a conductor on the rear face of the folding battery cell holder with cell apertures according to FIG. 1; and FIG. 19 is another view of a conductor on the rear face of the folding battery cell holder with cell apertures according to FIG. 1.

DETAILED DESCRIPTION

Aspects of the present disclosure involve a folding battery cell holder that may hold or otherwise fixture cells for various sized and formatted battery systems. In one of the illustrated configurations, the battery cell holder elegantly solves multiple challenges of battery system construction with a single part. The folding cell holder facilitates the scaling of battery cells in series and/or parallel, so it may be used to form a battery pack that is not confined to a particular battery architecture. Moreover, the design allows the cells to be fixtured not only in an orientation with terminals in-plane (parallel), but also end-to-end (serial—a more difficult to manufacture orientation). End-to-end orientation is achieved, in part, by having the folding cell holder be a fixture for a conductor attachment. The folding cell holder then stays with the cells as a packaging component.

In one embodiment, the folding cell holder accomplishes fixturing with a "living hinge" or a hinge made out of flexible material, such as plastic or the like, that is designed to bend or otherwise flex. The folding cell holder is also designed such that when it is bent into an end-to-end configuration, the fold captures the conductor and thus insulates the conductor. Once folded, an engaging feature may keep the part locked in the folded position. In-plane orientation is achieved, in part, through a keying system that forces assembly of the cell holders so that cells are connected in a parallel arrangement. Finally, the part is optimized to allow airflow through various void spaces within the cell holder while maintaining the tightest manufacturer specified cell spacing to allow for maximum power/energy density. These and other features and advantages are discussed in more detail below.

Figure 1:
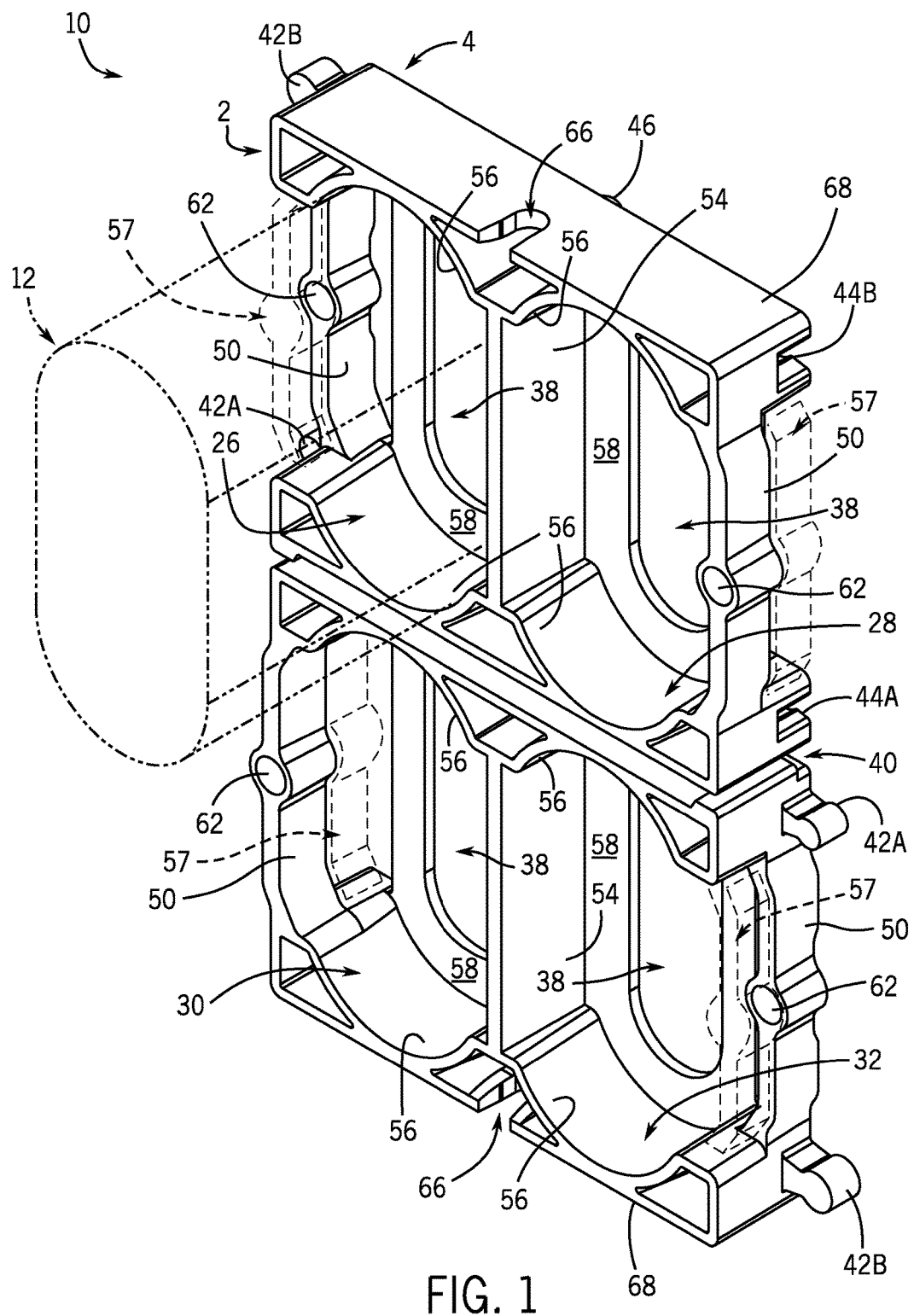
FIG. 1 is a front isometric view of a folding battery cell holder according to one embodiment of the present disclosure.
Figure 2:
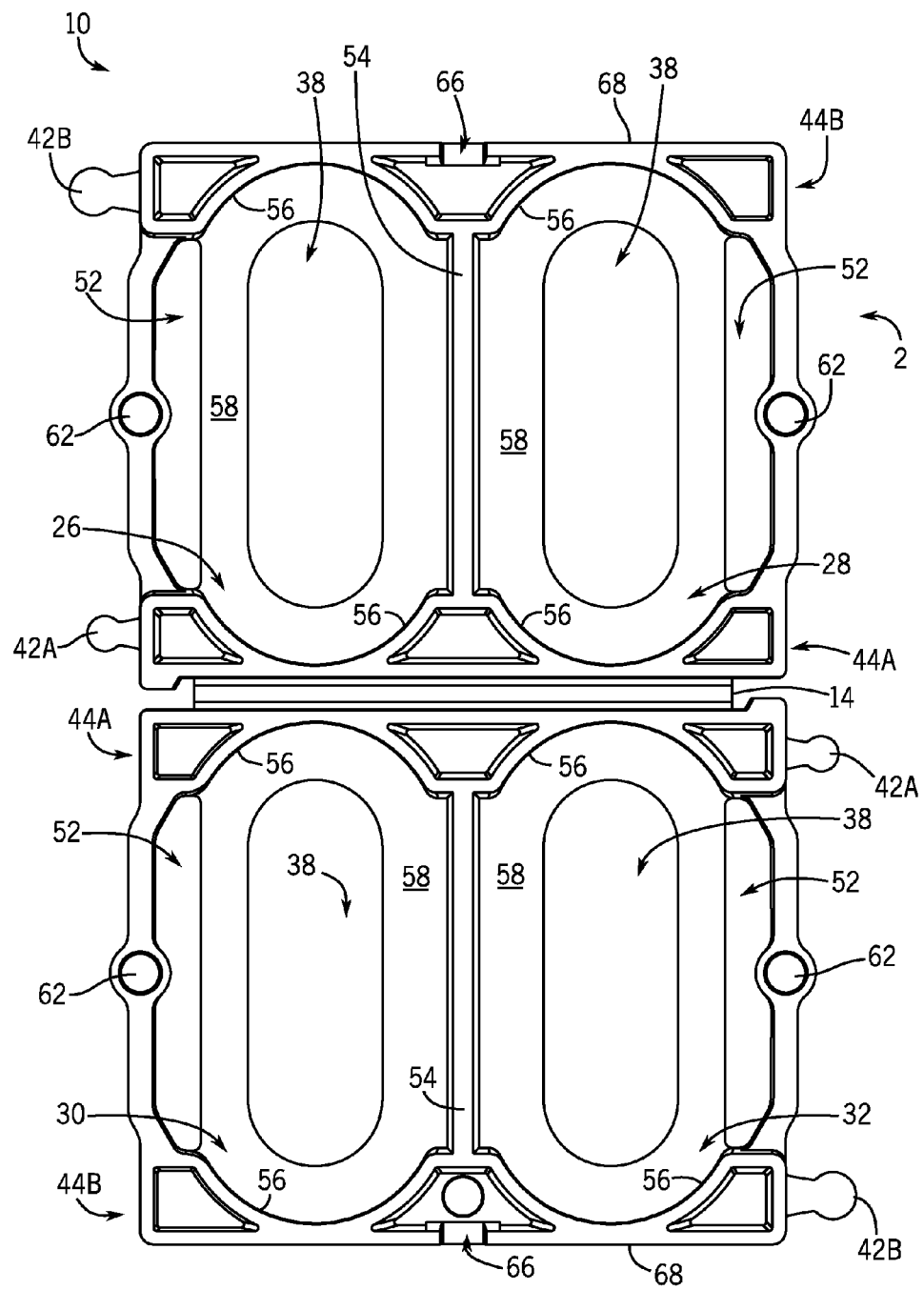
FIG. 2 is a front view of the folding battery cell holder of FIG. 1.
Figure 3:
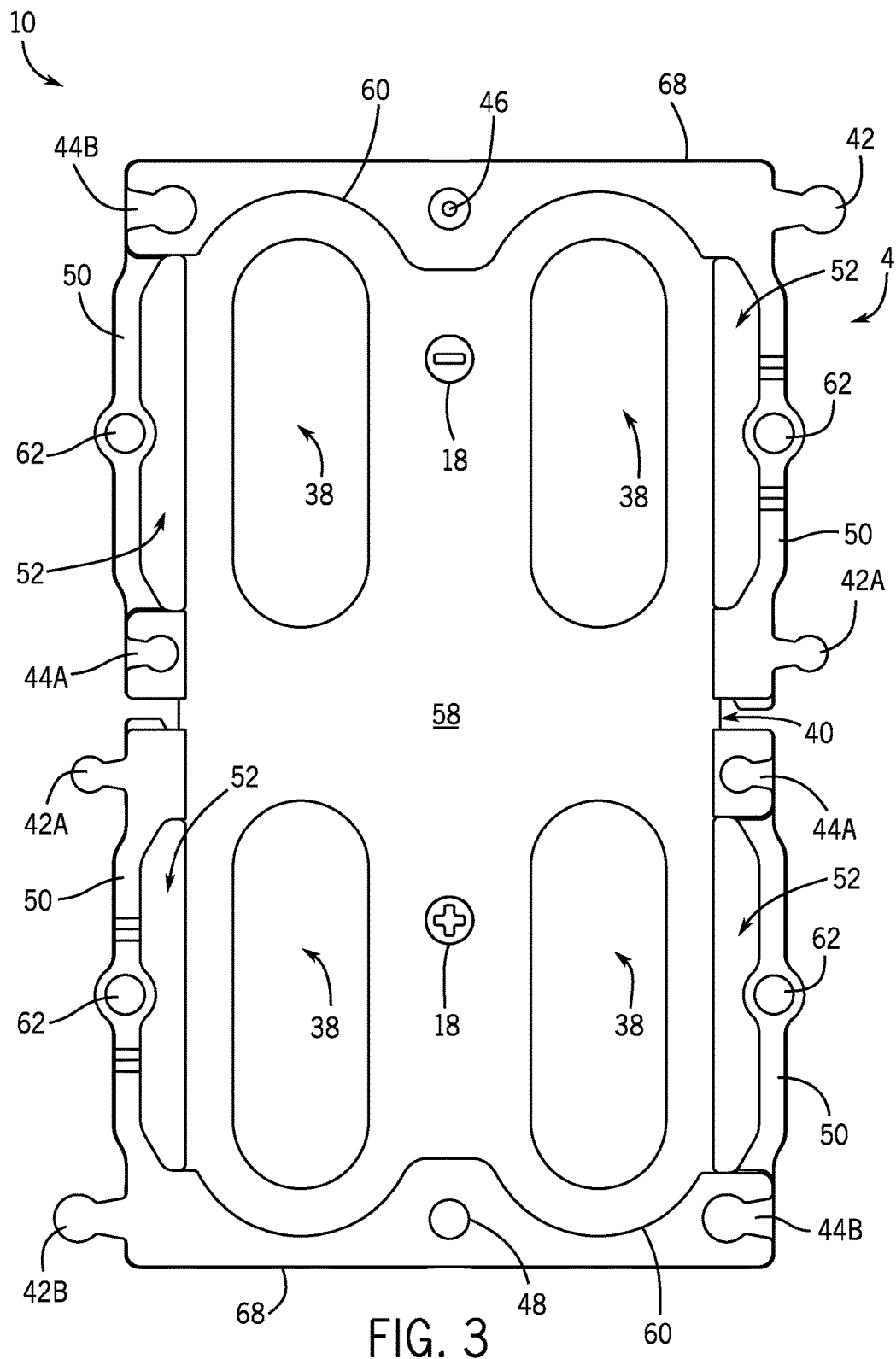
FIG. 3 is a back side view of the folding battery cell holder of FIG. 1.
Figure 6:
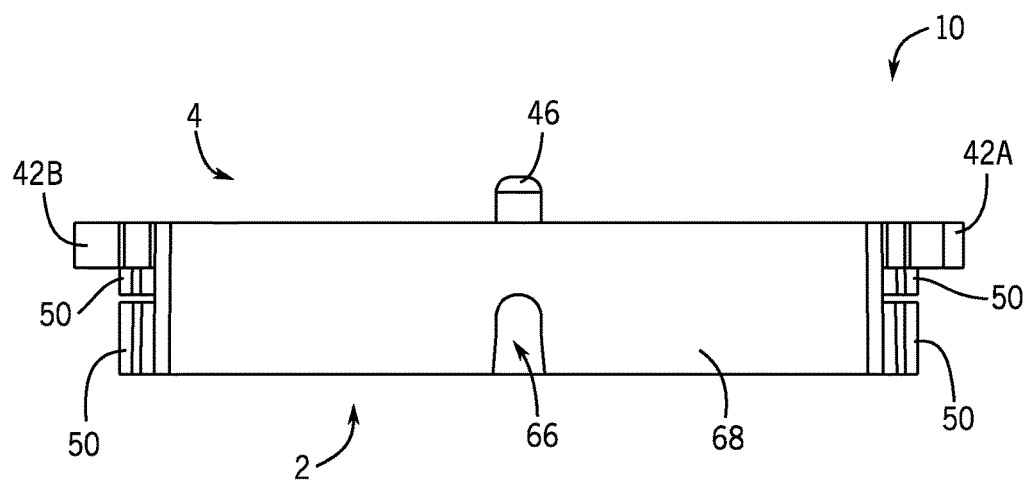
FIG. 6 is a top view of the folding battery cell holder of FIG. 1.
Figure 7:
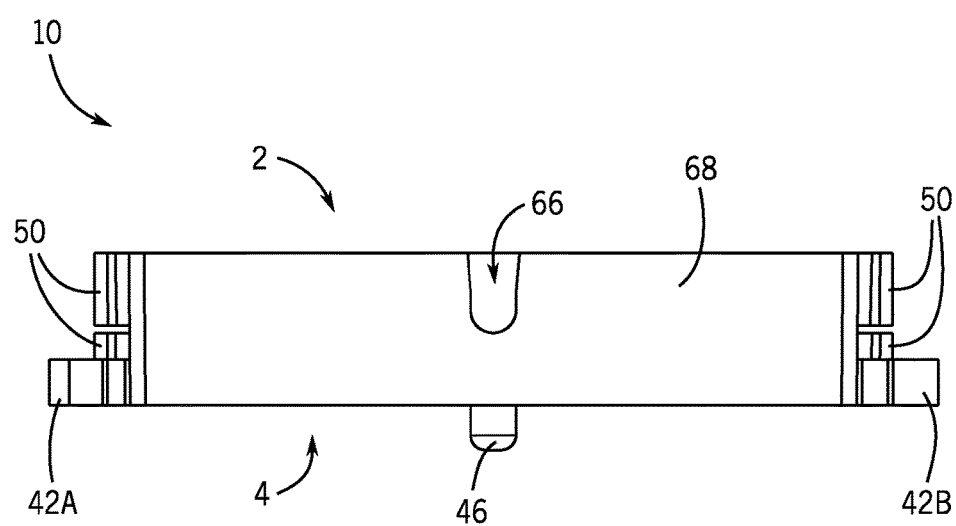
FIG. 7 is a bottom view of the folding battery cell holder of FIG. 1.

Referring now to FIGS. 1-3, among others, a folding battery cell holder 10 includes a battery cell side 2 for inserting battery cells 12 into the holder 10 and a conductor side 4, which is opposite the battery cell side 2 and configured to retain a conductor 16. The battery cell side 2 includes four battery cell slots 26, 28, 30, 32, with two slots on either side of a hinge feature 14. In one possible example, as detailed in FIG. 4, the hinge 14 is formed through a living hinge that allows the holder 10 to be folded along a hinge line. Other hinge structures besides a living hinge 14 are possible and can include mechanical hinges such as barrel hinges or continuous hinges, among others.

Figure 8:
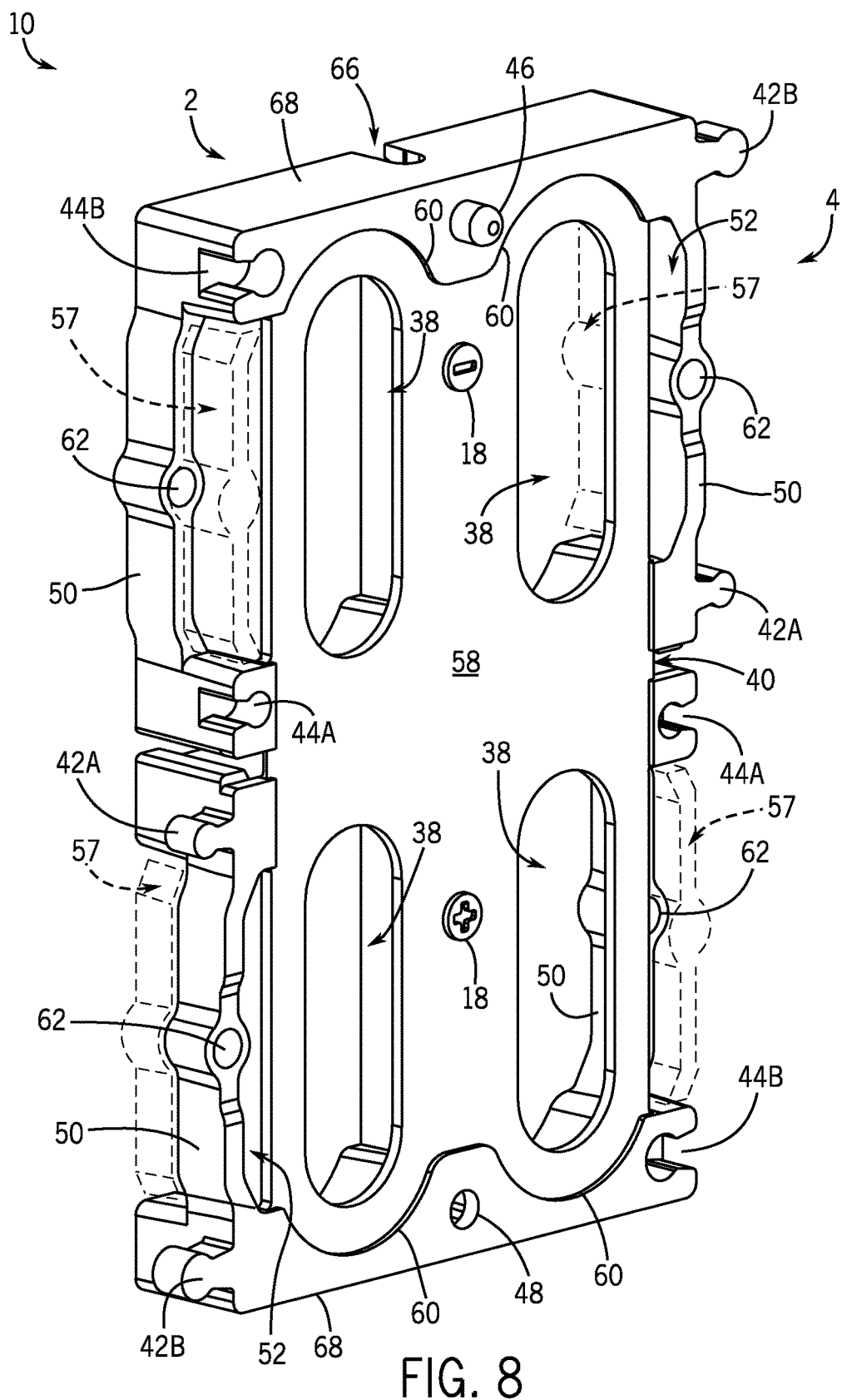
FIG. 8 is a back isometric view of the folding battery cell holder of FIG. 1.
Figure 9A:
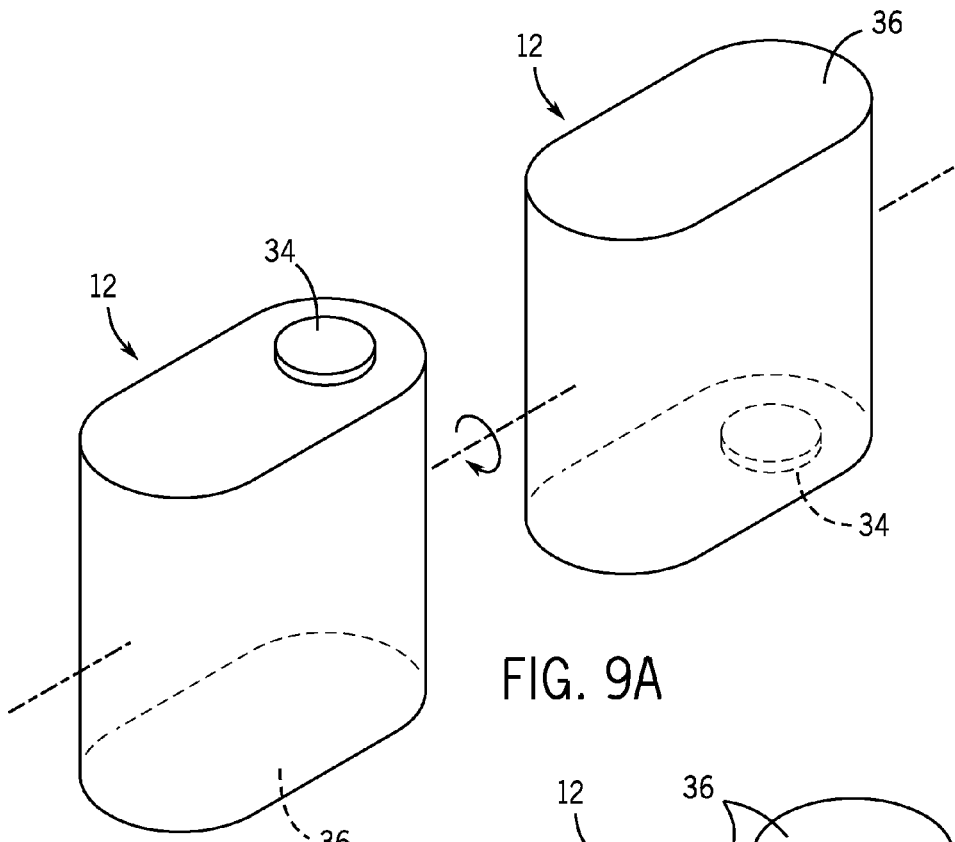
FIG. 9A is a drawing illustrating various views of a battery cell.
Figure 9B:
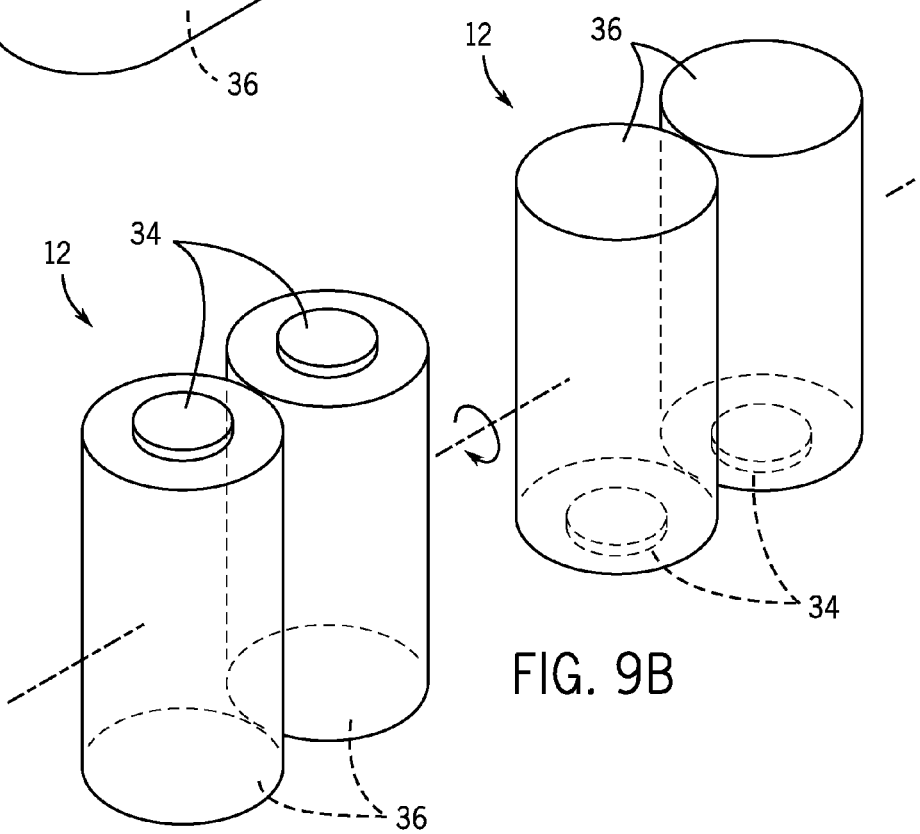
FIG. 9B is a drawing illustrating various views of a set of cylindrical battery cells.
Figure 9D:
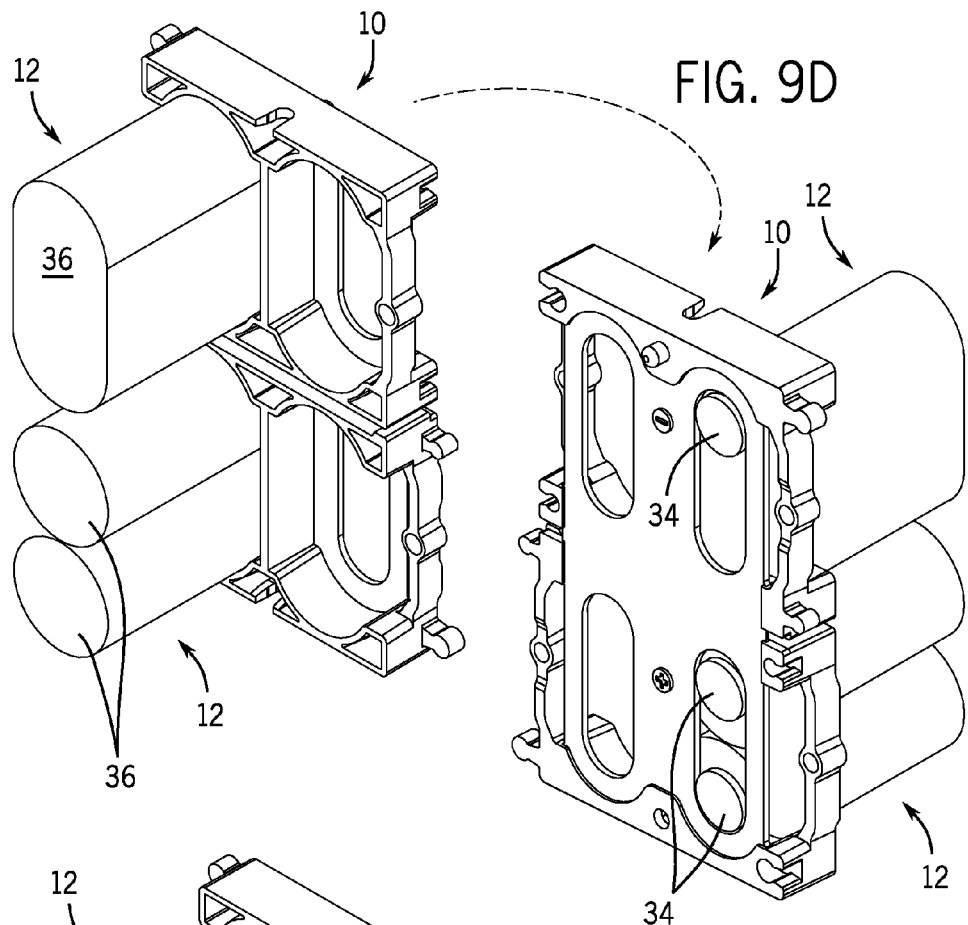
FIG. 9D is an isometric view of the folding battery cell holder of FIG. 1 that includes a single elliptical battery cell and a set of cylindrical battery cells.
Figure 10:
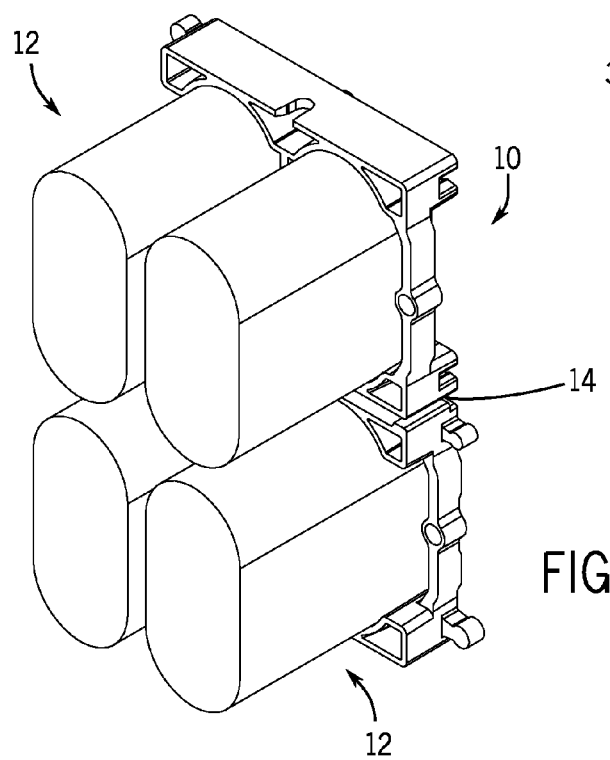
FIG. 10 is an isometric view of the folding battery cell holder of FIG. 1 that includes four battery cells.

As depicted in FIGS. 1 and 9A-9D, each cell slot 26, 28, 30, 32 secures one end of a battery cell 12 or a pair of battery cells 12. In the illustrated example, as depicted in FIG. 9D, each slot 26, 28, 30, 32 is configured to secure either one cell 12 or a pair of cylindrical cells 12 placed side by side. Each cell slot 26, 28, 30, 32 positions the positive conductor 34 of the cell or cells 12 or the negative conductor 36 of the cell or cells 12 at a cell aperture 38 through which a terminal 64 on the respective positive 34 or negative 36 conductors of the cell 12 or cells 12 may be electrically connected to the conductor 16 positioned within a conductive recess 40, which is formed on the conductor side 4 of the holder 10, as shown in FIGS. 3, 8, and 17-19, among others.

The cell slots 26, 28, 30, 32 include a dividing wall 54 that separates the two slots 26, 28 and 30, 32 on either side of the hinge feature 14. Additionally each slot 26, 28, 30, 32 includes rounded walls 56 adjacent the dividing walls 54 that generally match a profile of an outside surface of the cells 12. Extending from the dividing wall 54 on either end of the holder 10 is a cutout 66, which is formed on an outer wall 68 of the holder 10. As seen in FIG. 1, the cutout 66 includes a cavity formed between the rounded walls 56 and an underside of the outer wall 56. Each cutout 66 can accommodate the placement of a bolt or other hardware device for positioning the holder 10 relative to another holder 10 or securing two holders 10 together.

The slots 26, 28, 30, 32 also include a generally rectangular, planar backing 58 that the battery cells 12 contact when inserted into a slot 26, 28, 30, 32. In a certain embodiment, as illustrated in FIG. 8, the backing 58 is continuous over at least pairs of slots 26, 28 and 30, 32 on either side of the hinge 14. As evident in FIG. 8, the backing 58, on the conductor side 4 of the holder 10, is recessed from a pair of raised surface ends 60 that generally follow an arcuate outline of cells 12 that are inserted into slots 26, 28, 30, 32 on the slot side 2 of the holder 10. Referring to FIGS. 3 and 8, a portion of the backing 58, between the pair of raised surface ends 60 forms the conductive recess 40. In such a way, as the holder 10 is folded, the pair of raised surface ends 60 will contact each other and provide adequate space for the conductor 16 in the conductive recess 40.

As illustrated in FIG. 8, the backing 58 also includes engaging features 18 on opposing sides of the hinge 14 that secure the conductor 16 in place by the interaction between opposing engagement features when the holder 10 is folded. Alternatively, the engaging features can be screws or other fastening mechanisms adapted to secure the conductor 16 to the conductor recess 40.

Figure 12:
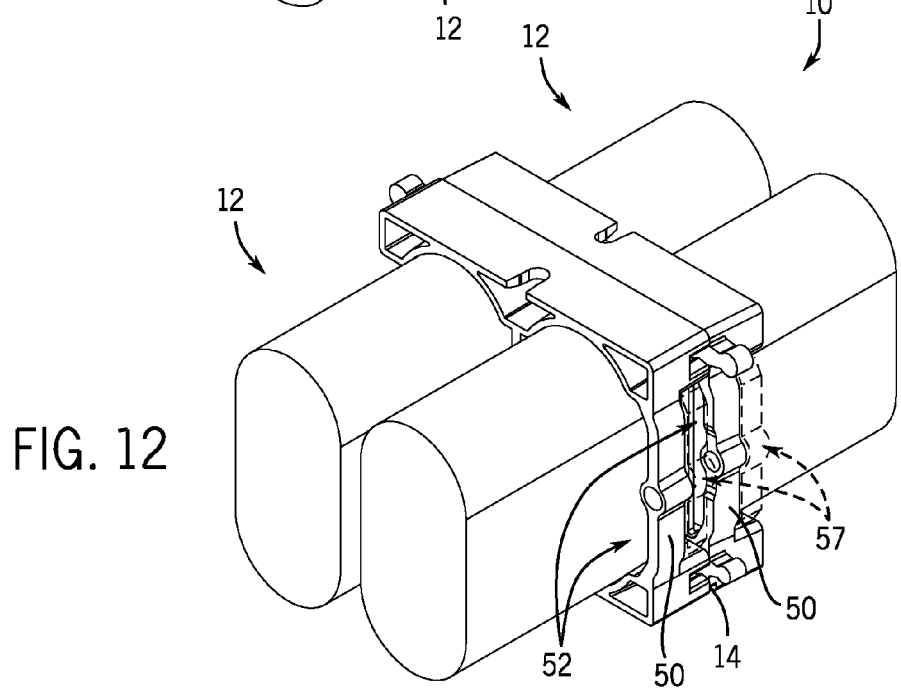
FIG. 12 is an isometric view of the folding battery cell holder of FIG. 1 in a fully-folded position that includes four battery cells.

Referring again to FIGS. 1, 2, and 8, among others, the slots 26, 28, 30, 32 further include partial side-walls 50 that are opposite the dividing walls 54, forming an outer boundary of each respective slot 26, 28, 30, 32 and an outer boundary of part of the holder 10. The partial side-walls 50 have a depth that is less than a depth of the outer wall 68. In one embodiment, the depth of the partial side-walls 50 is about half the depth of the outer wall 68. As seen in FIGS. 2 and 3, the partial side-walls 50 protrude outwardly from the holder 10 to provide an aperture or first void space 52 in the holder 10 between the backing 58 in each slot 26, 28, 30, 32 and each of the partial side-walls 50 for ambient or forced air to flow through the holder 10 and cool the cells 12. The first void space 52 is evident by the partial side-walls 50 being further from a center point of the cell apertures 38 than the dividing wall 54 is from the center point of the cell aperture 38. Referring to FIG. 12, the first void space 52 associated with each partial side-wall 50 is such that when the cell holder 10 is folded, pairs of first void space 52 are coextensive, thus allowing air to flow unimpeded through the holder 10 and cool the cells 12. The partial side-walls 50 further include apertures 62 located centrally in the partial side-walls 50. The side-wall apertures 62 are adapted to fit a through bolt to secure the holder 10 in a folded position. Alternatively, the apertures 62 can be used for any other purpose, such as the retaining wires that are passed through the apertures 62. Additionally, an outer surface of a portion of the partial side-wall 50 that is adjacent the aperture may provide a point for the battery cell 12 to frictionally contact and retain the cell 12 when a cell 12 is inserted into a slot 26, 28, 30, 32.

Turning now to interlocking features of the cell holder 10 and referring to FIGS. 1, 2, 3, 8, and 13A-13C, among others, the holder 10 includes a keying system 24 for interconnecting multiple cell holders 10 in a parallel 20 arrangement. The keying system 24 includes key structures 42A and 42B and matching key receptacles 44A and 44B, such as first 42A and second keys 42B and respective first 44A and second key receptacles 44B, which allow the battery cell holder 10 to be connected with an adjacent battery cell holder 10, which may in turn be connected with yet another battery cell holder 10, and so on, for parallel 20 cell connection. To interconnect multiple holders 10, the first and second keys 42B, 42A of a particular cell holder 10 are aligned with an adjacent holder's 10 corresponding first and second key receptacles 44A, 44B, and the keys 42A, 42B slide or snap into the corresponding key receptacles 44A, 44B. As seen in FIGS. 2 and 3, among others, the first 42A and second 42B keys are keyhole-shaped with a triangular shaft that outwardly extends from the holder 10 and culminates at a circular tip. Similarly, the first 44A and second 44B key receptacles are a substantially negative shape of the corresponding keys 42A, 42B such that when the keys 42A, 42B are matingly received in the respective key receptacles 44A, 44B, the circular tip of the keys 42A, 42B, and thus the holders 10, are held in place by the corresponding key receptacles 44A, 44B.

Referring to FIG. 3, the first key 44A is dimensionally smaller, relative to the second key 44B, and, correspondingly, the first key receptacle 44A is dimensionally smaller, relative to the second key receptacle 44B. Sizes of the respective first 42A and second 42B keys and the first 44A and second 44B key receptacles are such that the first key receptacle 44A is sized to matingly receive the first key 42A of an adjacent holder 10 and the second key receptacle 44B is sized to matingly receive the second key 42B of the adjacent holder 10. In such a way, the variation in sizes for keys 42A, 42B and corresponding key receptacles 44A, 44B ensure a uniform orientation of cell holders 10 when a holder 10 is interconnected with adjacent holder(s) 10, and prevent a user from inadvertently misconnecting the holders 10. While the keys 42A, 42B and corresponding key receptacles 44A, 44B are described as being keyhole shaped, the shape of the keys 42A, 42B and key receptacles 44A, 44B are intended to be non-limiting and can include differently shaped interlocking features.

Turning again to the cell holder's 10 cooling features, the holder 10 is designed to facilitate airflow to the cells 12 by incorporating void spaces in the holder 10. As evident in FIGS. 1, 4, 5, and 8, the partial side-walls 50 have a depth that is less than that of the cell holder 10 thereby forming a second void space 57 and a flow path for ambient or forced air to convectively cool the cells 12. Generally, the more surface area of the cells 12 that is exposed to airflow, the greater the rate of convective cooling of the cells 12. The location of the second void space 57 relative to the partial side-wall 50 is determined by the partial side-walls 50 positioning relative to the keys 42A, 42B and key receptacles 44A, 44B. Referring to FIGS. 1 and 8, the partial side-walls 50 that connect key receptacles 44A and 44B (i.e., partial side-walls 50 adjacent cell slots 28 and 30) are offset towards the battery cell side 2 of the holder 10. Conversely, partial side-walls 50 that connect keys 42A and 42B (i.e., partial sidewalls 50 adjacent cell slots 26 and 32) are offset towards the conductor side 4 of the holder 10. As seen in FIG. 12, when the holder 10 is in a folded position, sets of partial side-walls 50 are stacked in a staggered fashion so that stacked partial side-walls are not abutting each other. Instead, each partial side-wall 50 abuts a second void space 57.

Referring to FIG. 13A and the cross-sectional view of FIG. 13B, the partial side-walls 50 of adjacent holders interdigitate together to form a combined depth that is about a depth of the outer wall 68. As seen in FIGS. 13A-13C, the second void space 57 is eliminated at an interconnection between multiple holders 10. When multiple holders 10 are interconnected via the keying system 24, the partial side-walls 50 of each holder 10 that interconnect form a wall that eliminates the second void space 57 associated with each holder 10. The second void space 57 on partial side-walls 50 that are not interconnected with adjacent holders 10 remain unobstructed.

Turning now to the scalability of the holder 10, the combination of the living hinge 14 and the keying system 24 allows the cell holder 10 to be used to create end-to-end (series 22) cell scalability as well as side-to-side or in-plane (parallel 20) cell scalability. Turning first to end-to-end or series 22 cell scalability and referring to FIG. 14A, cells 12 are placed in the first 26 and second 28 slot with the same polarity conductors facing the respective conductor apertures 38. Thus, for example, a first cell 12 may be positioned in the first slot 26 with the positive conductor 34 facing the first conductor aperture 38 and a second cell 12 may be positioned in the second slot 28 with the positive conductor 34 facing the second conductor aperture 38. Cells 12 are also positioned in the third 30 and fourth 32 slots but with conductors 16 opposite those of the cells 12 in the first 26 and second 28 slots facing the conductor apertures 38. So, for example, a third cell 12 may be positioned in the third slot 30 with the negative conductor 36 facing the third conductive aperture 38 and a fourth cell 12 may be positioned in the fourth slot 32 also with the negative conductor 36 facing the third conductor aperture 38. As shown comparatively in FIG. 9C, the conductor apertures 38 may be uniformly sized and shaped or the conductor apertures 38 may be formed in accordance with the terminal polarity and cell type. In FIGS. 9C and 15-17, the conductor apertures 38 are positioned and shaped in accordance with the type and shape of each cell's 12 respective positive 34 and negative 36 conductors. For example, referring to FIGS. 9A and 9B, a cross section of the conductive ends 34, 36 of the cells 12 can be elliptical, stadium shaped, or circular, among other shapes. Referring to FIG. 9A, a battery cell terminal 64 on the positive conductive end 34 of an elliptical or stadium shaped cell 12 is generally located at either side (i.e., not centered) of the positive conductive end 34. On the other hand, a terminal 64 on a positive conductive end 34 of a circular cell 12, as seen in FIG. 9B, is generally located at the center of the positive conductive end 34. Continuing with FIG. 9A-9B, the terminal 64 on the negative conductive end 36 of most battery cells 12 is located centrally on the cell 12.

Figure 16:
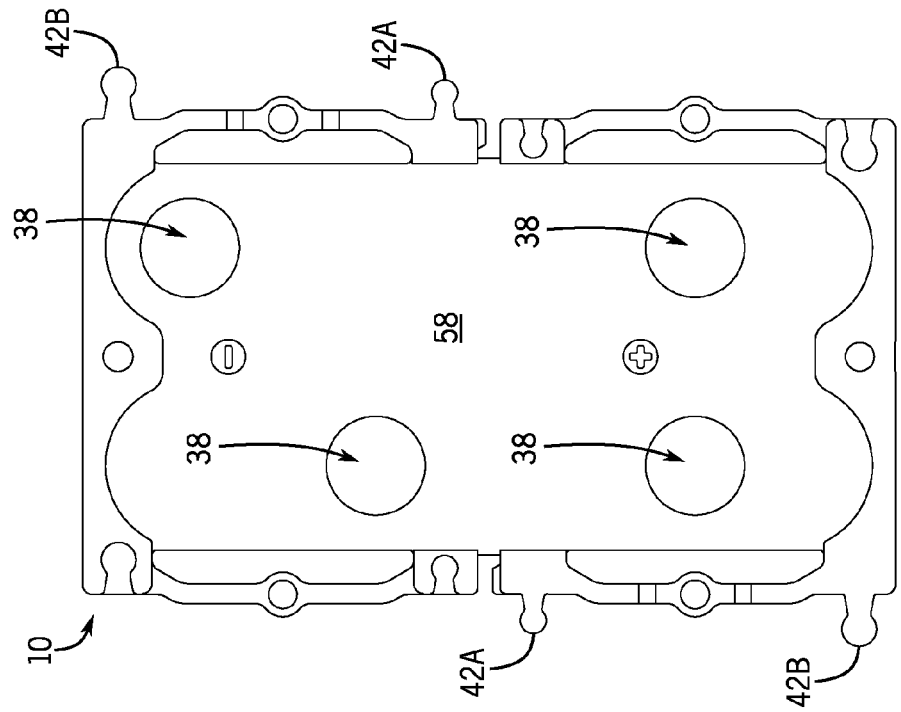
FIG. 16 is a back view of the folding battery cell holder depicting an alternate design of cell apertures.
Figure 15:
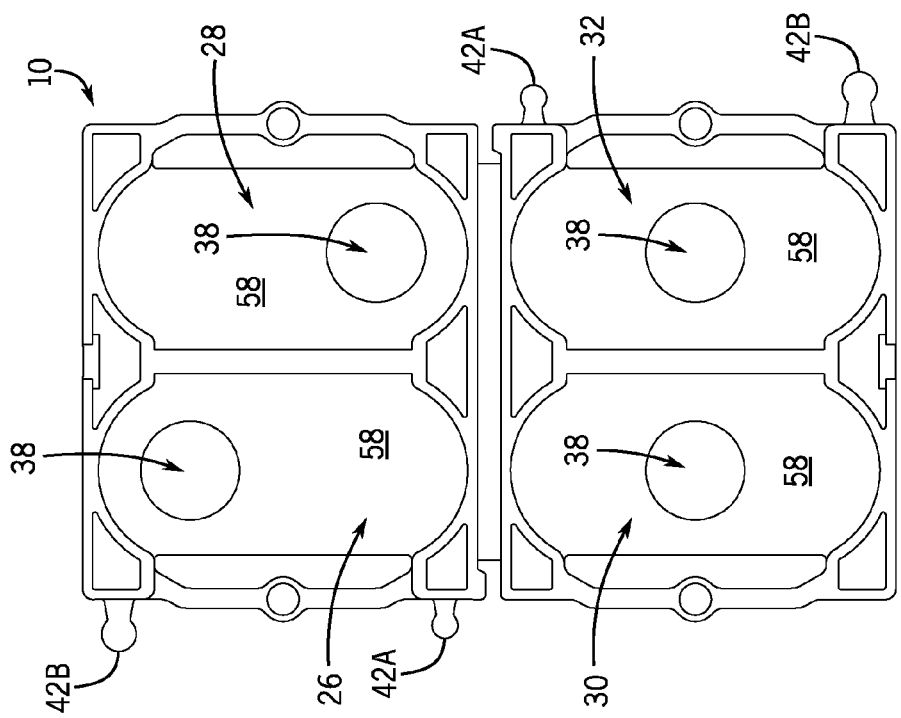
FIG. 15 is a front view of the folding battery cell holder depicting an alternate design of cell apertures.

As seen in FIGS. 9C, and 15-18, the holder's 10 cell apertures 38 are shaped so as to receive the terminal 64 of: 1) the positive conductive ends 34 of a cell 12, 2) the negative conductive ends 36 of a cell 12, or 3) either the positive 34 or negative 36 conductive ends of a cell 12. In the first instance and as seen in FIGS. 15-17, the cell apertures 38 are circular in order to expose a terminal 64 from a positive conductive end 34 of a cell 12 that is placed in the slot 26, 28, 30, 32. In this example, the circular apertures 38 are placed on opposing sides of the slot, as seen in FIG. 9C. In the second instance and as seen in FIGS. 15-17, the cell apertures 38 are circular and centered in the slots 26, 38, 30, 32 so as to expose a terminal 64 from a negative conductor 36. In the third instance and as seen in FIGS. 2, 3, and 18, among others, the cell apertures 38 are stadium shaped so as to expose the terminal 64 of either the positive conductive end 34 or the negative conductive end 36 of a cell that is placed in the slots 26, 28, 30, 32. In the first and the second instances, the shape and position of the cell aperture 38 helps ensure the cells 12 are placed in the slots 26, 28, 30, 32 with the correct polarity in the correct conductor aperture 38, thereby the incorrect polarity is not exposed at the aperture 38.

Referring to FIGS. 17-19, a conductor 16, such as a conductive and flexible metallic plate, is positioned within the conductor recess 40 and electrically connected with respective positive 34 and negative 36 cell conductors thereby electrically connecting the pair of the first and second cells 12, in the first 26 and second 28 slots, in series 22 with the pair of the third and fourth cells 12, in the third 30 and fourth 32 slots. The conductor 16 may be secured in the recess 40 by way of the engaging features 18 that may comprise screws or other fastening mechanisms. FIGS. 17-19 illustrate one example of a conductive plate 16 positioned to form an electrical connection between a first pair of cells 12 and a second pair of cells 12.

Referring to FIG. 17, to provide further electrical insulation to the conductor 16, an insulating sheet 70 that is substantially the same shape as the conductive recess 40 can be coupled to a portion of the conductor side 4 of the holder 10 to electrically insulate the conductor 16 when the holder 10 is in the folded position. In the embodiment of FIG. 17, the insulating sheet 70 is made from an electrically insulating material and is sized to fit over about one half of the conductive recess 40 (e.g., from one of the raised surface end 60 to the living hinge 14). When the holder 10 is folded, the insulating sheet 70 is sandwiched between opposing sides of the conductor 16, thus insulating the conductor 16 from unintended electrical connections. In another embodiment, the insulating sheet 70 is foldable about the living hinge 14 and sized to fit over about the entire conductive recess 40. The insulating sheet 70 may be secured to the conductive recess 40 and/or the conductor 16 by the engaging features 18.

Figure 11:
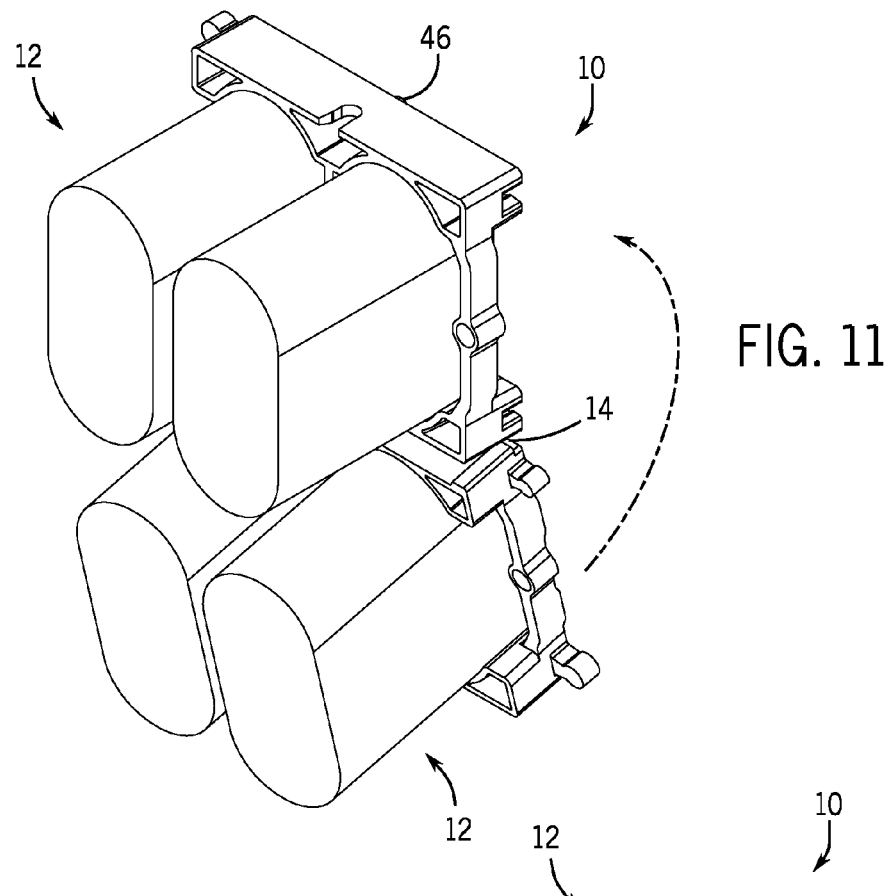
FIG. 11 is an isometric view of the folding battery cell holder of FIG. 1 in a partially-folded position that includes four battery cells.

Electrically connected in series 22, the cell holder 10 may be folded at the hinge 14 (as shown in FIGS. 11 and 12) to position the cells 12 in an end-to-end configuration. When folded, the conductor recess 40 captures the conductor 16 within the recess substantially insulating the conductor 16 from adjacent features that may conduct electric current. Insulation ensures that the electric current travels through the conductor 16 and not errantly through the adjacent features or inadvertently contacting other features before, during, or after assembly. The conductive recess 40 not only provides a space for the conductor 16 as well as electrical insulation; the recess 40 provides physical protection from obstacles that may dislodge the conductor 16 from contacting the terminals 64 on the conductive ends 34, 36 of the cells 12. In one example, the folding battery cell holder 10 is a single molded plastic part that is electrically insulating, chemically resistant and temperature tolerant. As an example, the holder 10 can be injection molded. When molded as a single part, referring to FIG. 4, the folding battery holder 10 defines a living hinge 14 along which the battery holder 10 is folded.

Referring to FIGS. 3-8, among others, a pin 46 and a corresponding pin socket 48 may be provided with the battery cell holder 10 to hold the cell holder 10 in the folded position. The pin 46 may press fit or otherwise frictionally engage the socket 48 or may include a mechanical snap or other means by which the holder 10 is held in the folded position. When folded, whether secured in the folded position or not, the battery holder 10 may be connected or stacked with other folded battery holders 10 and thereby connect additional sets of cells 12 in series 22.

Referring to FIG. 14A-14B, a battery cell holder 10 that is arranged in series 22 can be linked with additional holders 10 to create larger in series 22 battery packs. The polarity of the cells 12 in a holder 10 are arranged as described previously with respect to in series 22 or end-to-end configuration. When four elliptical or stadium shaped cells 12 are inserted into the slots 26, 28, 30, 32, four conductive cell ends remain unconnected to a holder 10. In this example, additional battery cell holders 10 and conductors 16 can be connected or stacked to the remaining unconnected ends of the cells 12. Further, additional cells 12 can be placed in the additional holders 10, accordingly. This scaling of the in series 22 battery packs can continue in order to achieve a particular battery pack architecture.

Many of the features in the part could have a different geometry and still serve the same function. The illustrations are just examples of how the features would work. In the case of the living hinge 14, a mechanical hinge could also function the same way. Also, the hinge 14 design itself could be a variety of geometries. Generally speaking, the hinge 14 fixtures a series 22 connection, and if desired can be folded to capture the conductor 16 in an end-to-end connection 22. Without the hinge 14 or with the hinge unfolded, the holder 10 still functions as a fixturing device unfolded for parallel configuration 20.

Turning now to a parallel 20 connection of cell holders 10 and respective cells 12, as depicted in FIG. 13A-13C, cells 12 are placed in the respective cell slots 26, 28, 30, 32 as described above relative to the series connection 22 with the exception that the polarity of all of the cells 12 placed in the cell holder 10 slots 26, 28, 30, 32 is the same. Stated differently, the same polarity terminal (i.e., positive 34 or negative 36) of all of the cells 12 is positioned at the conductor apertures 38. So, for example, a first cell 12 may be positioned in the first slot 26 with the positive conductor 34 facing the first conductor aperture 38 and a second cell 12 may be positioned in the second slot 28 with the positive conductor 34 facing the second conductor aperture 38. Cells 12 are also positioned in the third 30 and fourth 32 slot with conductors 16 the same as those of the cells 12 in the first 26 and second 28 slots facing the conductive apertures 38. So, for example, a third cell 12 may be positioned in the third slot 30 with the positive conductor 34 facing the third conductor aperture 38 and a fourth cell 12 may be positioned in the fourth slot 32 also with the positive terminal 34 facing the third conductive aperture 38. Referring to FIGS. 13C, and 17-19, a conductor 16, such as a conductive and flexible metallic plate, is positioned within the conductor recess 40 and electrically connects with respective positive cell conductors 34 thereby electrically connecting the pair of the first and second cells 12 in a common voltage plane with the pair of the third and fourth cells 12. Thus, the four cells 12 have a respective set of conductors 16, either positive 34 or negative 36, forming a common reference voltage plane by way of the conductor 16. The cells 12 become electrically connected in a parallel 20 connection when a second battery cell holder 10 is used to interconnect the opposite polarity terminals of the cells 12.

Referring to FIGS. 13A-13C, a set of cells 12 in the first cell holder 10 may be placed in parallel 20 with another set of cells 12 in an adjacent holder 10 by interconnecting the battery holders 10 at the first 42A and second keys 42B and respective first 44A and second key receptacles 44B. As depicted in FIG. 13C, a conductor 16 may be placed to electrically connect the adjacent holders 10 so as to achieve a common voltage plane across a row of multiple holders 10.

The keying system 24 for facilitating parallel 20 connections can be changed from the example illustration, with other interlocking feature configurations and numbers possible. One purpose is to have a part that mates to itself ad-infinitum in the side to side direction. This allows the battery (i.e., group of cells 12) to be scaled in parallel 20, where the basic building block is four cells 12 in parallel 20 (i.e., when one cell 12 occupies each slot 26, 28, 30, 32). The basic building block, however, can be any convenient number, but the feature adds design flexibility for cross-application functionality. So, for example, the current design includes two slots 26, 28 and 30, 32 on either side of the hinge 14, but is also possible to include one slot or three or more slots on either side of the hinge. It is also possible to simplify the design to not include a living hinge 14 and to have only included the structure to one side of the hinge 14. In this example, the basic building block is only two cells 12. The design also allows a system to be prototyped faster by having a flexible building block, but the parallel 20 connection may be eliminated for high volume optimization when a pack geometry is established.

In either the series 22 or parallel 20 arrangement, the interconnection of cell holders 10 provides for an air flow path through the first 52 and second 58 void spaces if the holders 10 are used in a system with air flow based thermal management. As seen in FIGS. 13A-13C and 14B, if multiple holders 10 are arranged in a parallel 20 arrangement, the second void space 57 at the interconnection of holders 10 is occupied by the partial side-wall 50 from an adjacent holder 10. The first void space 52, however, remains unobstructed at the interconnection of holders 10.

In one particular example, the battery cell holder 10 is dimensioned to fit conveniently within conventional 19 or 23 inch computer rack systems. For example, a set of cells 12 and holders 10 interconnecting the terminals 64 of positive conductors 34 and negative conductors 36 in a parallel 20 arrangement may be about 1 U in height, which provides for ease of use with computer rack systems that have slots and shelving that is some factor of 1 U (about 1.75 inches).

As discussed above, the illustrated folding battery holder 10 includes both the ability to scale in series 22 and/or in parallel 20. For applications only requiring series 22 scalability, the parallel interlocking features or keying system 24 may be removed, and for features only requiring parallel 20 scalability the hinge 14 and other series 22 scalability features may be removed.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

I claim:

1. A modular battery cell holder comprising:
    a unitary injection molded holder defining a cell side and a conductor side opposite the cell side, the cell side comprising:
    a first cell slot and a second cell slot separated from a third cell slot and a fourth cell slot by a living hinge, each cell slot configured to receive a respective first battery cell, second battery cell, third battery cell, and fourth battery cell,
    a first slot aperture formed in the first cell slot, a second slot aperture formed in the second cell slot, a third slot aperture formed in the third cell slot, and a fourth slot aperture formed in the fourth cell slot;
    the conductor side comprising:
    a conductive recess formed and recessed between a first raised end and a second raised end positioned on opposing sides of the living hinge, the conductive recess including a substantially planar backing that is separated by the living hinge; and a conductive element received in the conductive recess that electrically couples the first battery cell and the second battery cell with the third battery cell and the fourth battery cell through the respective slot apertures.

2. The modular battery cell holder of claim 1, wherein the first, the second, the third and the fourth cell slots have a shape that is based on a corresponding battery cell shape that is inserted into the respective slots.

3. The modular battery cell holder of claim 2, wherein the first, the second, the third, and the fourth cell slots are formed in a frame, the frame further including at least one key and at least one key receptacle whereby a second modular battery cell holder may be connected to the modular battery cell holder to form a parallel connection between the first battery cell, the second battery cell, the third battery cell, the fourth battery cell, and a set of battery cells fixtured in the second modular battery cell holder.

4. The modular battery cell holder of claim 3, wherein the at least one key is keyhole shaped and extends outward from the frame, and the at least one key receptacle is a substantially matching negative keyhole shape that extends inward of the frame and is configured to matingly receive the at least one key.

5. The modular battery cell holder of claim 4, wherein the frame is foldable about the living hinge and in a folded position a first and a second set of battery cells on respective opposing sides of the living hinge are affixed on a first conductive end to the modular battery cell holder, wherein the first set of battery cells may be connected on a second conductive end to a third modular battery cell holder and the second set of battery cells may be connected on a second conductive end to a fourth modular battery cell holder, whereby a series connection is formed between the fourth modular battery cell holder, the modular battery cell holder, the third modular battery cell holder, and the first and the second set of battery cells.

6. The modular battery cell holder of claim 5, further comprises partial side-walls on an outer portion of the frame that form an outer boundary to each of the first, the second, the third, and the fourth cell slots, the partial side-walls defining an aperture between the partial side-walls and each respective cell slot, the aperture adapted to allow airflow to cool the first, the second, the third, and the fourth battery cells.

7. The modular battery cell holder of claim 6, wherein the first and the second cell slots are separated by a first dividing wall and bounded by the partial side-walls, and the third and the fourth cell slots are separated by a second dividing wall and bounded by the partial side-walls.

8. The modular battery cell holder of claim 6, wherein each of the first, the second, the third, and the fourth cell slot apertures are offset from a center point between the partial side-walls and the respective first and the second dividing walls towards the respective first and the second dividing walls.

9. The modular battery cell holder of claim 8, wherein the frame has a first depth, the at least one first slot and the at least one second slot have a second depth that is substantially equal to the first depth, and the partial side-walls have a third depth that is less than the first and the second depths thereby facilitating convective cooling of the first, the second, the third, and the fourth battery cells.

10. The modular battery cell holder of claim 8, wherein the third depth is about half of the first depth.

11. The modular battery cell holder of claim 9, wherein the conductor side further comprises engaging features on each side of the hinge that secure respective portions of the conductive element to the recessed backing.

12. The battery cell holder of claim 10, wherein the conductor side further comprises at least one pin and at least one pin socket on opposing sides of the hinge, whereby the at least one pin is matingly received in the at least one pin socket when the frame is in the folded position.

13. The modular battery cell holder of claim 11, wherein when the modular battery cell holder connects with the second battery cell holder the partial side-walls of the battery cell holder interdigitates with the corresponding partial side-walls of the second modular battery cell holder.

* * * * *